(12) United States Patent
Fan

(10) Patent No.: US 7,314,287 B2
(45) Date of Patent: Jan. 1, 2008

(54) CANDLE LAMPS HAVING SOLAR ILLUMINATING DEVICES

(75) Inventor: Quanwei Fan, Guangzhou (CN)

(73) Assignee: Guangzhou Fapu Electronic & Technology Co., Ltd., Guangzhou, Guangdong Province (CN)

( * ) Notice: Subject to any disclaimer, the term of this patent is extended or adjusted under 35 U.S.C. 154(b) by 0 days.

(21) Appl. No.: 11/625,685

(22) Filed: Jan. 22, 2007

(65) Prior Publication Data

US 2007/0236923 A1    Oct. 11, 2007

(30) Foreign Application Priority Data

Apr. 11, 2006  (CN) ............... 200620057558

(51) Int. Cl.
*F21L 4/00* (2006.01)
*F21V 35/00* (2006.01)

(52) U.S. Cl. .............. 362/183; 362/163; 362/373

(58) Field of Classification Search ............. 362/161, 362/163, 179, 180, 181, 182, 183, 313, 314, 362/316, 373, 392, 399, 810
See application file for complete search history.

(56) References Cited

U.S. PATENT DOCUMENTS

| 739,689 | A | * | 9/1903 | Leveson ............. 362/399 |
| 2,263,622 | A | * | 11/1941 | Gabriel ............. 362/163 |
| 4,181,927 | A | * | 1/1980 | Garcia ............. 362/163 |
| 6,406,163 | B1 | * | 6/2002 | Yang ............. 362/183 |
| 2006/0109647 | A1 | * | 5/2006 | Liu ............. 362/183 |

FOREIGN PATENT DOCUMENTS

DE          19615895 C1 *  1/1998

* cited by examiner

*Primary Examiner*—Y. My Quach-Lee
(74) *Attorney, Agent, or Firm*—Barnes & Thornburg, LLP

(57) ABSTRACT

Disclosed is a candle lamp a base which comprises a base; a lampshade releasably mounted on the base; a candle holder disposed within the lampshade to hold a candle; a lid disposed above the lampshade; at least one solar power supplier arranged at an outer surface of the lid; and at least one illuminant electrically communicated with the solar power supplier.

11 Claims, 2 Drawing Sheets

CANDLE LAMPS HAVING SOLAR ILLUMINATING DEVICES

CROSS REFERENCE TO RELATED APPLICATIONS

The application claims the benefit of Chinese patent application No. 200620057558.4 filed on Apr. 11, 2006 which is explicitly incorporated by reference in its entirety.

BACKGROUND OF THE INVENTION

1. Field of the Invention

This invention relates generally to a candle lamp, and specifically, to a candle lamp with solar illuminating devices.

2. Description of the Prior Art

A conventional solar lamp needs to work in sunlight or at least in sunlight for a while, but would not work in continuous overcast or rainy days accordingly.

A candle lamp has been used for a long time. Currently the candle lamp mainly is used where electrical power is difficult to reach or at specific places that need to be decorated for example. However, the candle lamp is not convenient to use because the candle needs to be lighted manually and replaced frequently.

Thus, there has been a longstanding need to provide a lamp that combines a candle lamp with a solar lamp in the art.

SUMMARY OF THE INVENTION

The present invention is to provide a candle lamp with a solar illuminating device. In one embodiment of the present invention, the candle lamp comprise a base; a lampshade releasably mounted on the base; a candle holder disposed within the lampshade to hold a candle; a lid disposed above the lampshade; at least one solar power supplier arranged at an outer surface of the lid; and at least one illuminant electrically communicated with the solar power supplier.

In an embodiment according to the present invention, the candle lamp further comprises a light sensitive element which can automatically turn on/off the illuminants.

It is to be understood that both the foregoing general description and the following detailed description are exemplary and explanatory but are not restrictive of the invention. The accompanying drawings, which are incorporated in, and constitute a part of this invention illustrate preferred embodiments of the invention and, together with the description, serve to explain the principles of the invention.

DETAIL DESCRIPTION OF THE INVENTION

The present invention will be described in detail with reference to the accompanying drawings.

Figure 1:
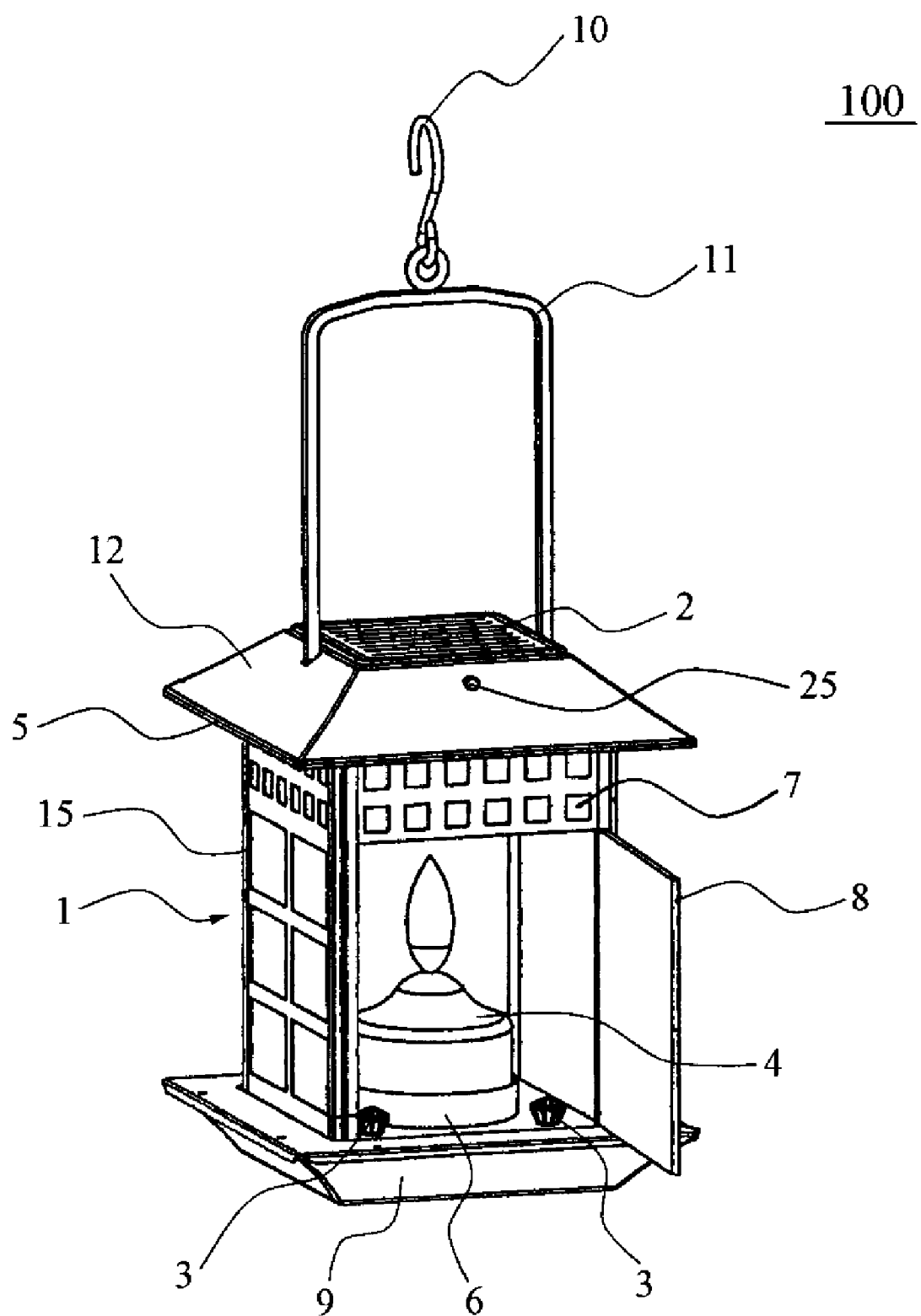
FIG. 1 is a perspective view of a candle lamp with a solar illumination device according to one embodiment of the present invention.

FIG. 1 illustrates a candle lamp with a solar illumination device according to an embodiment of the present invention. The candle lamp 100 comprises a lamp body 1 that has a lampshade 15 configured in the shape of a quadrangular prism. The lampshade 15 with its lower end portion is mounted on a base 9.

A plurality of ventilating openings 7 are provided at an upper portion of the lampshade. Each of four side portions of the lampshade is made to be transparent or semi-transparent. One of the side portions is configured to provide a movable door 8.

A lid 12 having the shape of a truncated pyramid and being connected to and above the lampshade 15 is provided in this embodiment. A heat isolation plate 5 may be provided between the lid and the lampshade to isolate heat generated by the candle 4.

An inverted U shaped handle 11 is provide to connect the lid 12 by its two arms, and a hook 10 is connected to the top portion of the inverted U shaped handle 11 so that the lamp can be suspended from an object.

A holder 6 to hold a candle 4 is disposed on the top surface of the base 9. The movable door 8 facilitates the candle 4 to be lighted and replaced.

A solar power supplier 2 is mounted to an outside surface of the truncated pyramid lid 12.

A plurality of illuminants 3 are provided on the base 9 which are electrically communicated with the solar power supplier 2 via electrical wires (not shown).

Figure 2:
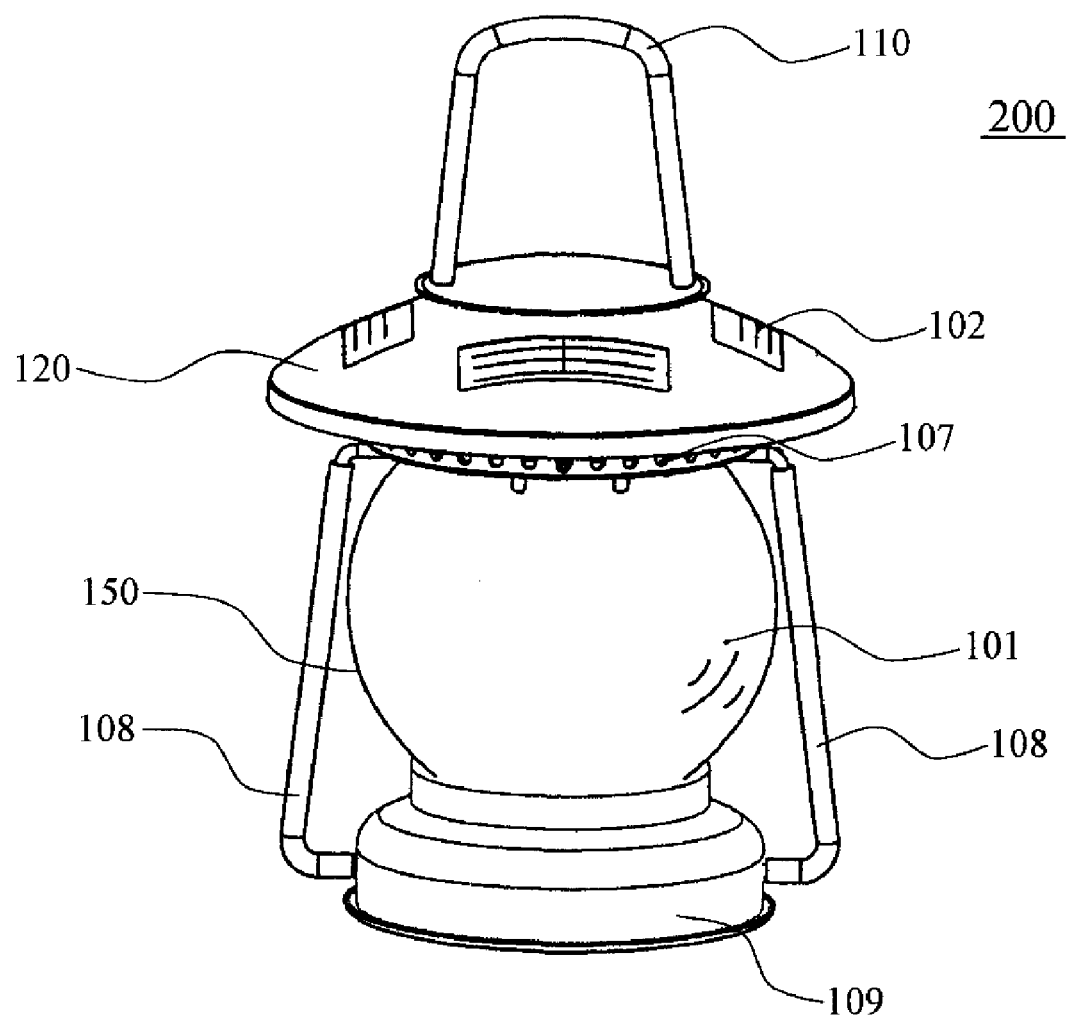
FIG. 2 is a perspective view of a candle lamp with a solar illumination device according to another embodiment of the present invention.

Referring now to FIG. 2, another embodiment of the present invention is provided. The candle lamp 200 in this embedment is configured like a conventional hurricane lamp which includes a lamp body 101 having a spherical transparent or semi-transparent lampshade 150. The spherical transparent lampshade 150 is mounted on a base 109.

A plurality of ventilating openings 107 are provided at an upper portion of the lampshade 150. Similar to FIG. 1, a plurality of illuminants (not shown) are provided on the base 109.

A lid 120 configured in a truncated cone shape is releasably mounted on the top portion of the lamp body 101 in this embodiment. A plurality of solar power suppliers 102 are mounted on the outside surface of the truncated cone lid 120 and electrically communicated with the plurality of illuminants via electrical wires (not shown).

An inverted U shaped handle 110 is connected to the lid 120.

In this embodiment, two side support bars 108 are symmetrically disposed at two sides of the lampshade, which are extended upwards from the base 109 to the upper end portion of the lampshade 101.

Similar to the above embodiment, a heat isolation plate may be provided between the lid 120 and the lampshade 150 so as to isolate the solar power supplier 102 from heat of the candle 4.

Figure 3:
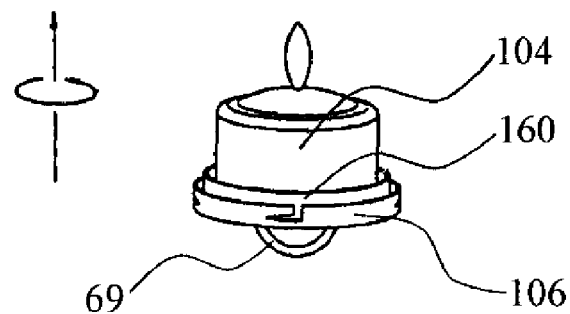
FIG. 3 shows a candle holder of the candle lamp according to the present application.

Now referring to FIG. 3, at the center of the base 109 is provided a through hole having a screw (not shown) to which a holder 106 to hold a candle 104 is fit with a threaded recess 160. In this way, the candle holder 106 can be releasably fixed to the base 109. The candle holder 106 provides a control handle 69 extended downward from its bottom surface to facilitate it fixing to or releasing from the base 109.

In the present invention, a light sensitive switch 25 as shown in FIG. 1 which is known well in the art may be provided for automatically turning on/off the illuminants in a manner known in the art. In an alternative embodiment of the invention, a manual switch can be provided between the solar power supplier(s) and the illuminants, so that the solar lamp can be turned off by manually operating the switch when only the candle light is needed. The illuminants can be connected to optical fibers located at a desired place to be illuminated.

It should be appreciated by one of ordinary skill in the art that any modifications or variations to the present invention that are not departed from the spirit and concept of the invention can be made.

The invention claimed is:

1. A candle lamp comprising
a base;
a lampshade releasably mounted on the base;
a candle holder disposed within the lampshade to hold a candle;
a lid disposed above the lampshade;
at least one solar power supplier arranged at an outer surface on the lid;
at least one illuminant electrically communicated with the solar power supplier; and
a light sensitive switch in communication with the solar power supplier and the illuminant,
wherein the lampshade provides a plurality of ventilating openings at an upper portion thereof.

2. The candle lamp of claim 1, further comprising an inverted U handle connected to the lampshade.

3. The candle lamp of claim 1, wherein the lid is made of heat insulation materials.

4. The candle lamp of claim 1, wherein the light sensitive switch automatically turns on/off the illuminant.

5. The candle lamp of claim 1, wherein the lampshade is configured to form a hollow quadrangular prism, one side of which is operable.

6. The candle lamp of claim 1, further comprising a heat isolation plate disposed between the lid and the lampshade.

7. A candle lamp comprising
a base;
a lampshade releasably mounted on the base;
a candle holder disposed within the lampshade to hold a candle;
a lid disposed above the lampshade;
at least one solar power supplier arranged at an outer surface on the lid; and
at least one illuminant electrically communicated with the solar power supplier;
wherein the candle holder provides a threaded recess releasably connected to the base;
wherein the lampshade is configured in a truncated spherical shape, and is releasably mounted to the base.

8. The candle lamp of claim 7, wherein the candle holder provides a control handle extended downwards from its bottom surface.

9. The candle lamp of claim 8, further comprising two supportive bars symmetrically disposed at two sides of the lampshade, which are extended upwards from the base to the upper end portion of the lampshade.

10. A candle lamp comprising:
a base;
a lampshade configured in a truncated spherical shape and releasably mounted on the base;
a candle holder disposed within the lampshade to hold a candle;
two side support bars symmetrically disposed at two sides of the lampshade, which are extended upwards from the base to the upper end portion of the lampshade;
a lid configured in a truncated cone shape and disposed above the lampshade;
a plurality of solar power suppliers arranged at an outer surface of the lid; and
at least one illuminant electrically communicated with the solar power supplier.

11. The candle lamp of claim 10, further comprising an inverted U shaped handle fixed to the lid.

* * * * *